United States Patent
Chen et al.

(10) Patent No.: US 9,055,283 B2
(45) Date of Patent: Jun. 9, 2015

(54) METHODS FOR DISPLAY UNIFORM GRAY TRACKING AND GAMMA CALIBRATION

(71) Applicant: Apple Inc., Cupertino, CA (US)

(72) Inventors: Cheng Chen, San Jose, CA (US);
Gabriel Marcu, San Jose, CA (US);
Jiaying Wu, San Jose, CA (US); Anuj Bhatnagar, San Jose, CA (US);
Hongqin Zhang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 110 days.

(21) Appl. No.: 13/841,540

(22) Filed: Mar. 15, 2013

(65) Prior Publication Data
US 2014/0267785 A1    Sep. 18, 2014

(51) Int. Cl.
*H04N 17/02*    (2006.01)
*H04N 17/04*    (2006.01)

(52) U.S. Cl.
CPC ............. *H04N 17/02* (2013.01); *H04N 17/04* (2013.01)

(58) Field of Classification Search
CPC ........... H04N 9/69; H04N 9/73; H04N 17/02;
H04N 1/6058; H04N 1/6077; G09G 5/02;
G09G 5/10; G09G 2320/066; G09G
2320/0666; G09G 2320/0673; G06T 11/001
USPC ............ 345/88, 589, 590, 591, 690; 382/167;
348/189, 671, 672, 673, 674, 675
See application file for complete search history.

(56) References Cited

U.S. PATENT DOCUMENTS

| | | | |
|---|---|---|---|
| 6,972,772 B1 * | 12/2005 | Chen et al. | 345/589 |
| 7,605,823 B2 * | 10/2009 | Stokes et al. | 345/589 |
| RE42,089 E | 2/2011 | Holmes | |
| 2005/0099429 A1 * | 5/2005 | Chen et al. | 345/589 |
| 2006/0050080 A1 * | 3/2006 | Chen et al. | 345/593 |
| 2007/0285378 A1 * | 12/2007 | Lankhorst et al. | 345/102 |
| 2010/0259551 A1 * | 10/2010 | Kao | 345/590 |
| 2012/0188367 A1 | 7/2012 | Marcu | |
| 2014/0139571 A1 * | 5/2014 | Albrecht et al. | 345/694 |

FOREIGN PATENT DOCUMENTS

| | | |
|---|---|---|
| WO | 2007018969 | 2/2001 |
| WO | 2012030718 | 3/2012 |
| WO | 2012151421 | 11/2012 |

OTHER PUBLICATIONS

Reza Safaee-Rad, Milivoje Aleksic, "R/G/B Color Crosstalk Characterization and Calibration for LCD Displays", Apr. 27, 2011, SPIE-IS&T Electronic Imaging, vol. 7866 786604-1, Qualcomm, San Diego, CA, USA.
Chu et al., U.S. Appl. No. 61/699,782.
Wu et al., U.S. Appl. No. 13/477,680, filed on May 22, 2012.

* cited by examiner

*Primary Examiner* — Tom Sheng
(74) *Attorney, Agent, or Firm* — Kendall P. Woodruff

(57) ABSTRACT

A method is provided for calibrating a display having color channels. Each color channel is capable of adjusting settings for pixel values at gray level entries. The method includes selecting a gray level entry for calibration. The method also includes providing a target white point in chromaticity coordinates (x, y) and a target brightness at the selected gray level entry to the display. The method further includes adjusting the setting for the pixel values for the color channels at the selected gray level entry such that the display achieves the target white point and the target brightness at an adjusted pixel value.

20 Claims, 7 Drawing Sheets

FIG. 6A  RED CHANNEL
FIG. 6B  GREEN CHANNEL
FIG. 6C  BLUE CHANNEL
FIG. 6D  GRAY TRACKING

METHODS FOR DISPLAY UNIFORM GRAY TRACKING AND GAMMA CALIBRATION

TECHNICAL FIELD

Embodiments described herein generally relate to display calibration methods. More specifically, embodiments relate to white point calibration, gray tracking calibration, and gamma calibration of display devices.

BACKGROUND

Many portable digital devices incorporate at least one display screen to exchange information with users. Sample displays may incorporate liquid crystal display (LCD) technology, which is one of the most widely used display technologies. An LCD generally includes a backlight module, such as a light emitting diode (LED), a bottom polarizer, a TFT glass, liquid crystal molecules, a color filter glass, and a front polarizer. Light emitted from the backlight module passes through all the LCD components to generate desired images. The display may also include organic light emitting diode (OLED), plasma, and the like.

Displays may vary from panel to panel, even in the same product line or manufacturing line, due to inherent properties of the displays. For example, variations exist in LCD components, such as backlight variations due to LED wavelength and phosphor concentration, color filter thicknesses, and the like. Thus, each display may have slightly different color characteristics, white points and the like.

A white point of a display panel is defined by a pair of chromaticity values (x and y) that represent the color produced by the panel when the panel generates all colors at full power. For example, when red, green, and blue channels for a display panel are all active at full power, the chromaticity values, as measured in Cartesian coordinates x and y with respect to a chromaticity diagram, are the white point of the display panel. FIG. 1 illustrates sample white point variations among display panels of the same type, where a horizontal axis and a vertical axis correspond to chromaticity coordinates x and y, respectively. Each display panel has a native or original white point, which is measured without any correction. These representative values, are meant as examples and not limiting, other display may generate different data points.

The white point discrepancies shown in FIG. 1 may be corrected based upon a display white point calibration. White point calibration uses a target white point, which may be the white point corresponding to the D65 illuminant of the International Commission on Illumination (CIE). Any suitable target white point may be used. For example, each panel is tuned to have the same target white point by adjusting display control settings such as gain values for red, green, and blue channels individually during the white point calibration. After the white point calibration, the deviation among different panels may be reduced such that the white points of the panels would be within a range of target chromaticity coordinates $(x_0, y_0)$. If a panel, after the white point calibration, still has a white point beyond the specified range from the target chromaticity coordinates, the panel is considered to fail the calibration and may be sent to failure analysis or further diagnostics.

However, users may still observe color differences between different panels although the white points of the different panels are calibrated to have the same target. Therefore, it may be useful to develop methods for further improving color uniformity.

SUMMARY

Embodiments described herein may provide a unit based display color calibration approach, which combines the white point calibration, gray tracking calibration, and gamma calibration into a single step. The white point calibration is performed at maximum pixel levels for white color and allows all the displays to have nearly the same target white point or the same color. The gray tracking calibration is performed at various gray levels for each color channel and allows each display to have the same color for all gray levels. The gamma calibration requires the display to meet a target gamma for all color channels and allows all the displays to have the same contrast.

The calibration of the present disclosure generates a lookup table (LUT) that includes adapted pixel values corresponding to native pixel levels for each color channel, such as red, green and blue channels. The adapted pixel values are corrected pixel values from the native pixel levels of the display, depending upon the calibration. When using the adapted pixel values, all displays may be calibrated to have the same target white point $(x_0, y_0)$ or the same color, and each of the displays may have the same color for all gray levels and thus may produce uniform color appearance for different gray levels. Additionally, when using the adapted pixel values obtained from the calibration, the display may also achieve the target gamma for all color channels such that all the displays may have the same gamma.

The disclosure also provides a model for the white calibration point with correction factors to R, G, and B scaling factors. The correction factors take consideration of color shift and sub-pixel crosstalk. The correction factors measure the extent of the color shift and sub-pixel crosstalk and may also help reduce the iterations in calibration.

In one embodiment, a method is provided for calibrating a display having color channels. Each color channel is capable of adjusting settings for pixel values at gray level entries. The method includes selecting a gray level entry for calibration. The method also includes providing a target white point in chromaticity coordinates (x, y) and a target brightness at the selected gray level entry to the display. The method further includes adjusting the setting for the pixel values for the color channels at the selected gray level entry such that the display achieves the target white point and the target brightness at an adjusted pixel value.

In another embodiment, a method is provided for calibrating a display having color channels. The method includes calibrating the display to meet a target white point in chromaticity coordinates (x, y) and a target brightness. The method also includes determining a 3 by 3 conversion matrix from the scaling factors R, G, B to color space X, Y, Z, and generating scaling factors R, G, B for each of the color channels. The method further includes determining color space Xi, Yi, Zi at a gray level i, and obtaining corrector factors at the gray level i based upon the inverse of the 3 by 3 conversion matrix and the color space at the gray level.

Additional embodiments and features are set forth in part in the description that follows, and in part will become apparent to those skilled in the art upon examination of the specification or may be learned by the practice of the embodiments discussed herein. A further understanding of the nature and advantages of certain embodiments may be realized by reference to the remaining portions of the specification and the drawings, which forms a part of this disclosure.

BRIEF DESCRIPTION OF THE DRAWINGS

FIG. 6A shows a gray level dependent primary color shift in chromaticity coordinate x for a red channel, according to embodiments of the present disclosure.

FIG. 6B shows a gray level dependent primary color shift in chromaticity coordinate x for a green channel, according to embodiments of the present disclosure.

FIG. 6C shows a gray level dependent primary color shift in chromaticity coordinate x for a blue channel, according to embodiments of the present disclosure.

FIG. 6D shows a gray level dependent primary color shift in chromaticity coordinate x for all color channels, according to embodiments of the present disclosure.

DETAILED DESCRIPTION

The present disclosure may be understood by reference to the following detailed description, taken in conjunction with the drawings as described below. It is noted that, for purposes of illustrative clarity, certain elements in various drawings may not be drawn to scale, may be represented schematically or conceptually, or otherwise may not correspond exactly to certain physical configurations of embodiments.

Several factors may contribute to a color difference in a display, as seen by a user. First, display gray tracking may affect the color difference. Specifically, the display performance typically varies with the gray level or pixel level of the display. It should be mentioned that white point calibration only requires displays to have the same color chromaticity coordinates to meet target chromaticity coordinates, and the same brightnesses as a target brightness for a white color at maximum pixel levels for all color channels.

Second, color shift may also affect the color difference. "Color shift" means that chromaticity coordinates (x, y) vary with color. One color may have different chromaticity coordinates from another color at the same gray level. Color shift may also be dependent upon gray levels or pixel levels. The color shift may be more or less at one gray level than another gray level.

Third, sub-pixel crosstalk may affect the color difference. Specifically, one sub-pixel may contribute to the brightness of another sub-pixel. This sub-pixel crosstalk may also be dependent upon gray or pixel levels. The crosstalk may be more or less at one gray level than another gray level.

The present disclosure provides calibration methods for displays to achieve uniform color performance for all gray levels and all color channels. In some embodiments, displays may be calibrated to have the same gamma, which is referred to as "gray tracking calibration" and "gamma calibration." Calibration may generate a lookup table that includes adapted pixel values at each pixel entry for each of the color channels, such as red, green and blue.

The present disclosure also provides calibration methods for including correction factors in white point calibration. The correction factors take into consideration the color shift and sub-pixel crosstalk. In some embodiments, there are individual correction factors for all gray levels and for all color channels. The correction factors may be combined with the lookup table from the gray tracking calibration and the gamma calibration to more thoroughly calibrate a display.

Figure 1:
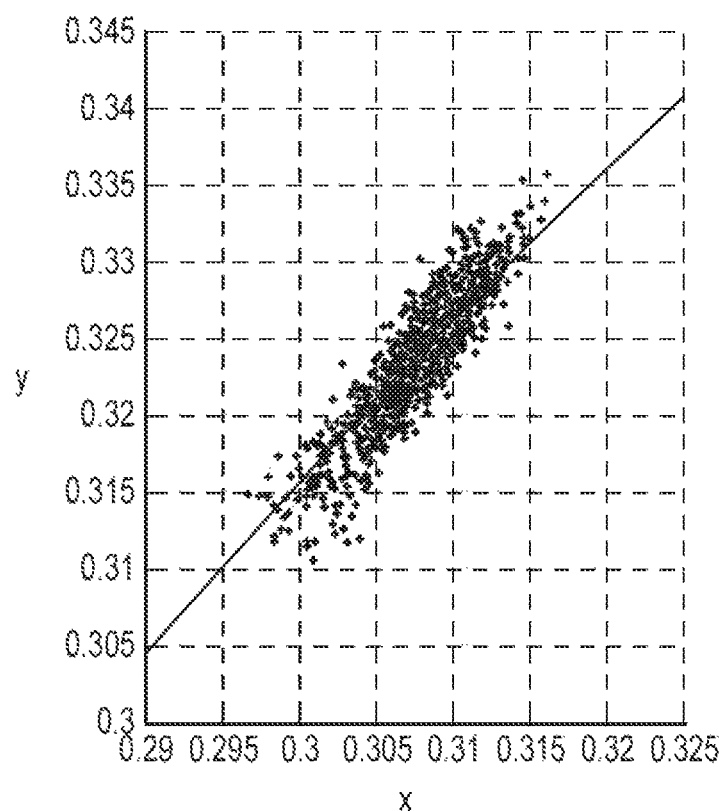
FIG. 1 illustrates white point variations among display panels, typically of the same type.
Figure 2A:
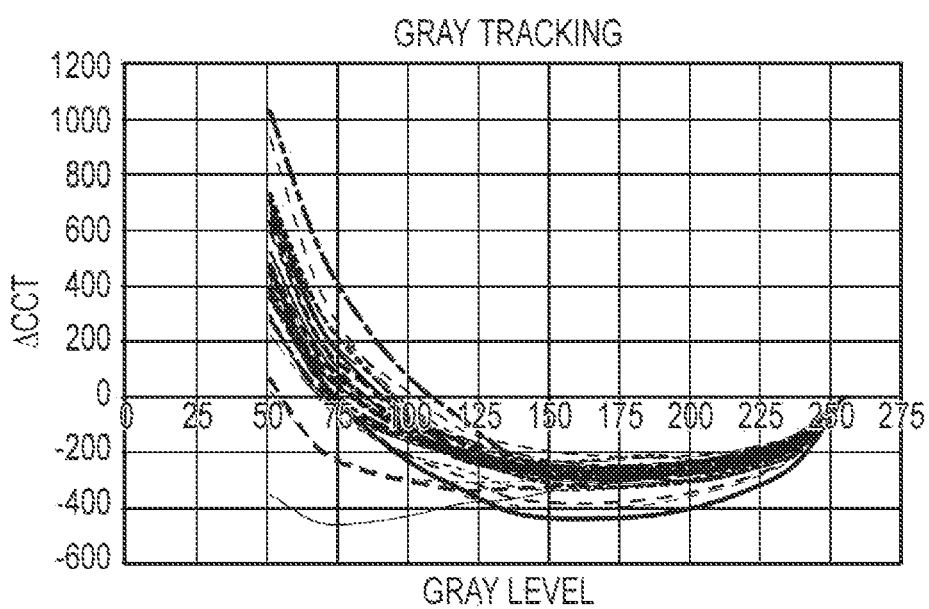
FIG. 2A shows a graph of display gray tracking variations among display panels, typically of the same type, according to embodiments of the present disclosure.

FIG. 2A shows display gray tracking variation for a number of displays, according to embodiments of the present disclosure. In FIG. 2A, a horizontal axis represents gray levels and a vertical axis represents correlated color temperature (CCT) differences ($\Delta$CCT) from the white point. The multiple $\Delta$CCT curves represent different panels of the same type. As shown, $\Delta$CCT does not equal to zero at gray levels other than the white point at a maximum level (e.g. 255), which means that the $\Delta$CCT for other gray levels than the maximum gray level do not follow the white point. Also, human vision is very sensitive to the color difference in neutral color regions, such as the middle gray levels. In FIG. 2A, the gray level ranges from 50 to 255, where the maximum gray level 255 corresponds to the white point. In the middle gray region (e.g. gray level ranging from 150 to 175), the $\Delta$CCT may reach up to 400 K. Such a large $\Delta$CCT typically is visible to human vision. For example, when a user turns on a virtual keyboard, which is often displayed in the middle gray region on a mobile device, the color may look more yellowish than the display white point in terms of chromaticity. As shown in FIG. 2A, large variations may be observed from panel to panel with gray level or gray tracking, especially at low gray levels.

In general, gray tracking variation may be caused by red, green, and/or blue gamma discrepancies. FIG. 2B shows intensity or brightness versus gray level according to embodiments of the present disclosure. For example, curves 202, 204 and 206 represent red, green and blue colors, respectively. These curves 202, 204, 206 vary with gray levels and do not overlap, which indicate different gamma values for different colors. FIG. 2A shows that, as the gray level increases, the intensity increases for red, green and blue. At a maximum gray level of 255, the intensity of red, green and blue channels all reach the highest intensity.

Figure 2C:
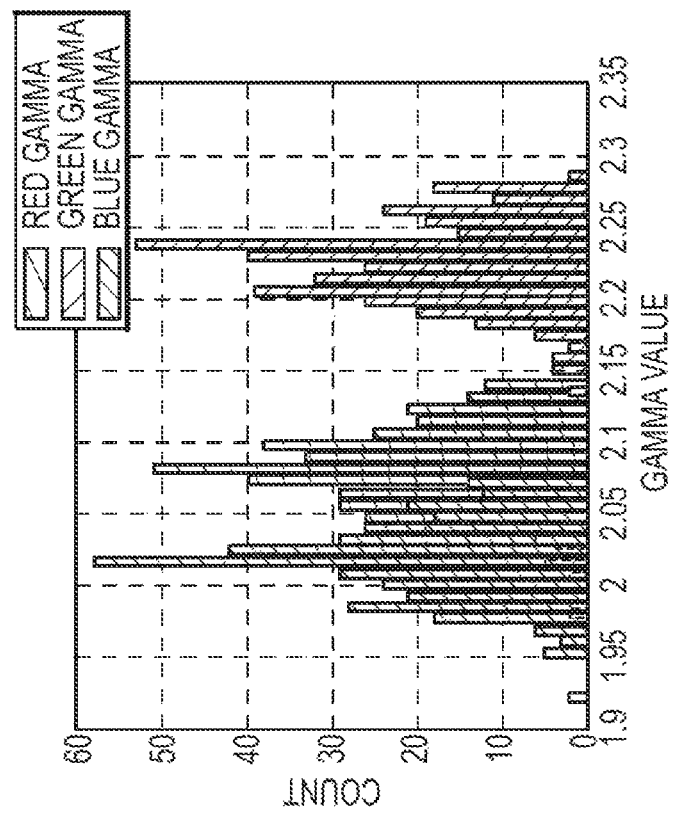
FIG. 2C shows a graph of histograms of RGB gamma distribution which are obtained from FIG. 2A.
Figure 2B:
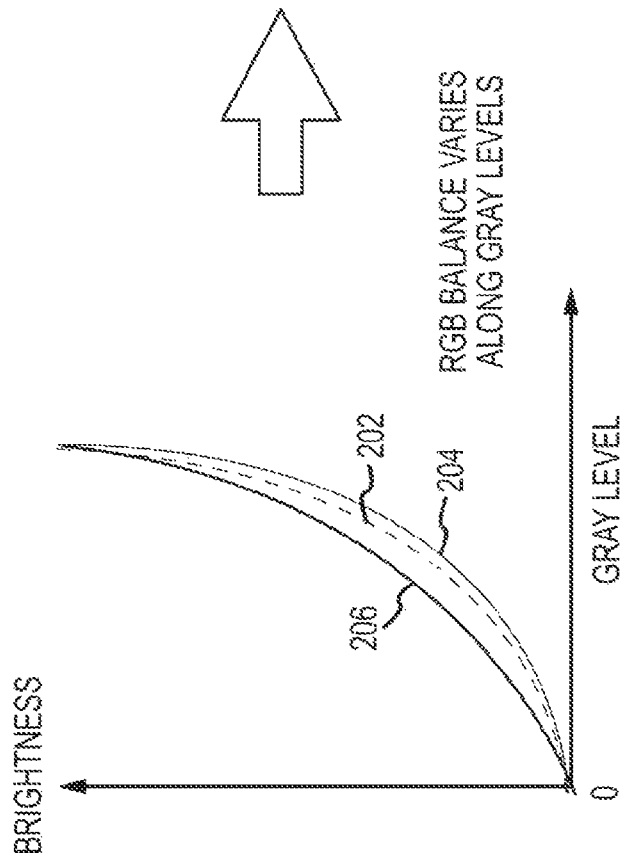
FIG. 2B shows a graph of intensity or brightness versus gray level according to embodiments of the present disclosure.

FIG. 2C shows histograms of RGB gamma distributions which are obtained from FIG. 2A. As shown in FIG. 2B, the gamma for green has a peak near 2.2 while the gamma for red is near 2.1 and the gamma for blue is the lowest among the three colors, and is near 2. These representative values, are meant as examples and not limiting, other display may generate different data points.

Figure 3:
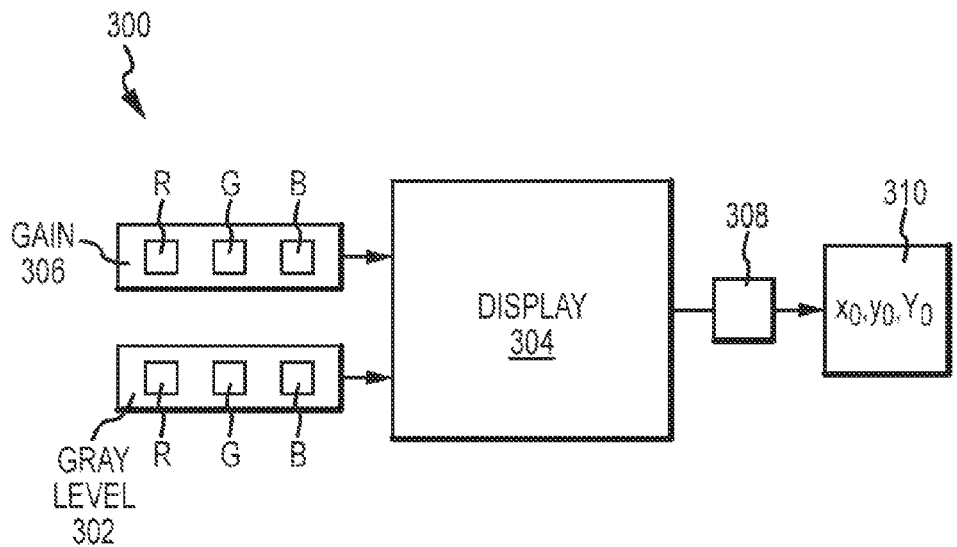
FIG. 3 illustrates a schematic of a display system with an input and an output according to embodiments of the present disclosure.

FIG. 3 illustrates a display system with inputs and outputs according to embodiments of the present disclosure. Display system 300 includes gray level control 302 for red, green and blue channels. The gray level control 302 may be adjusted during a display calibration and set to an adapted pixel value for a pixel level entry or pixel level index. Display system 300 may also include or utilize gain controls 306 for red, green, and blue channels for a display 304. The gain controls 302 may control the gain values obtained from a temperature compensation. Display system 300 also includes or outputs color output values 310 characterized by chromaticity coordinates x and y, as well as brightness at a gray level Yi. The chromaticity coordinates and the brightness may be measured by a device or tester. The display system 300 may be calibrated by the following procedure, discussed with respect to FIG. 4.

Figure 4:
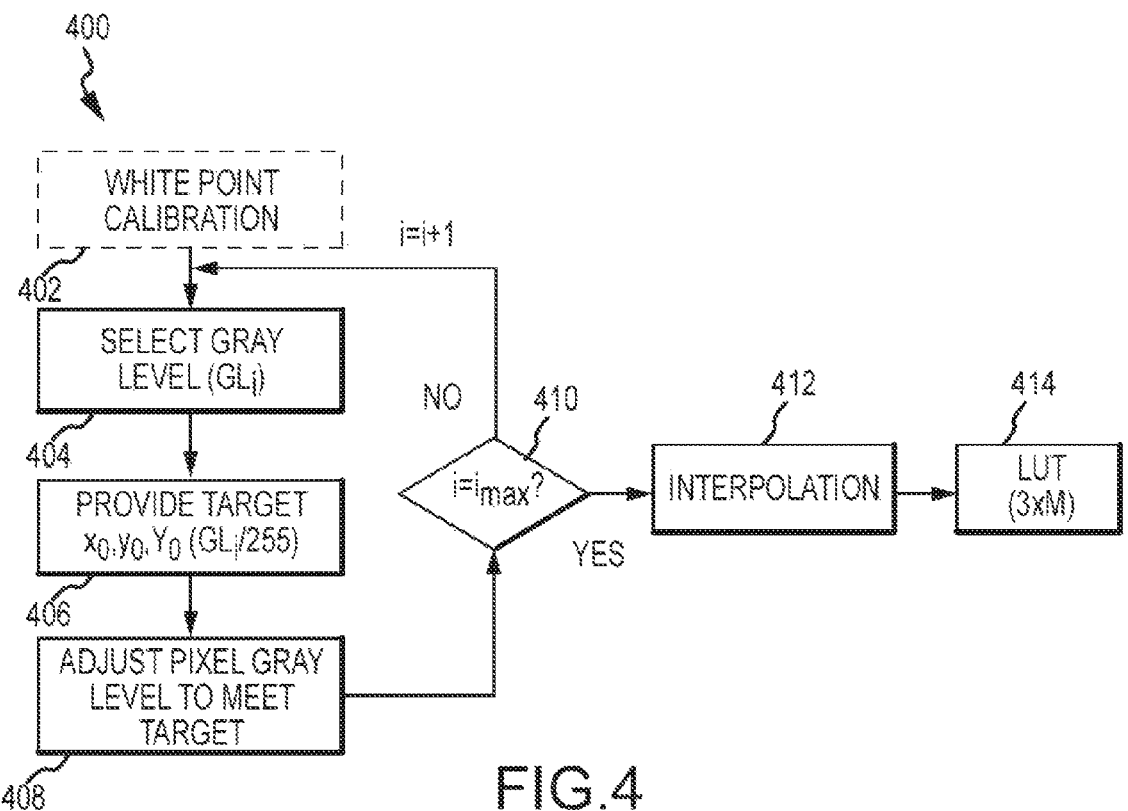
FIG. 4 is a flowchart illustrating operations of a sample method for display color calibration, according to embodiments of the present disclosure.

FIG. 4 shows a flowchart illustrating operations for display calibration, according to embodiments of the present disclosure. Calibration method 400 may include a white point calibration, a gray tracking calibration or calibration at individual gray levels, and a gamma calibration. In alternative embodiments, one or more of these calibrations may be omitted. First, the white point calibration may be optionally performed at operation 402. In operation 402, the display is characterized by measurements of chromaticity coordinates and brightness using tester 308 (as illustrated in FIG. 3) while adjusting a gray level index for red, green, and blue channels up to a maximum level. The resulting measurements provide a baseline that includes a native or uncalibrated white point, a native or uncalibrated gamma, and uncalibrated curves of brightness versus gray levels for red, green, and blue colors.

More details on white point calibration are disclosed in a related patent application P16562USP1, Application No. 61/699,782, entitled "Subtractive Color Based Display White Point Calibration," (Chia-Ching Chu et al.), the disclosure of which is incorporated herein by reference in its entirety. As disclosed in this related patent application, the colors cyan, magenta, and yellow are used to compensate sub-pixel crosstalk in addition to the 3×3 matrix. In addition, the characterization can also include sampled gray levels for native gamma estimation. For example, several high end gray levels may be measured to estimate the local gamma for fast white point calibration, as disclosed in another related patent application P13378US1, application Ser. No. 13/477,680, entitled "Method and Apparatus for Display Calibration," (Jiaying Wu et al.), the disclosure of which is incorporated herein by reference in its entirety.

At operation 404, some gray levels are selected for calibration. The total number, ranges and steps of the gray levels may be determined based on the implementation time limitation and/or the desired calibration accuracy. Generally, higher accuracy, more steps of gray levels may take longer implementation time. In some embodiments, only a few selected gray levels, such as gray levels 64, 128, 192, and 255 may be calibrated, which reduces calibration time. Generally, the spacing between two closest gray levels may be substantially equal as long as the shape of the intensity curve is substantially smooth. Alternatively, the spacing may vary depending upon the shape of the intensity curve versus gray levels. For example, if there are kinks on the intensity curve, there may be non-equal spacing. In other embodiments, every gray level between 64 and 255 may be calibrated, which increases calibration time.

At operation 406, for each gray level to be calibrated, a calibration target is provided in terms of target chromaticity coordinates $(x_0, y_0)$ and a target brightness $Y_0$, where the target chromaticity coordinates $(x_0, y_0)$ define the display color across all gray tracking levels including a maximum gray level where a white point is defined when all color channels are turned on at full power or the maximum gray level. The target calibration brightness $Y_i$ at any gray level represented by step index "i" may be formulated as a function of both gray level and gamma, i.e.

$$Y_i = Y_0 * (GLi/255)^\gamma \qquad \text{Eq. (5)}$$

where $Y_0$ is the brightness for a fully white pixel or display, which means that red, green, and blue channels are all at the maximum level, such as 255. $GL_i$ stands for the gray level at step index "i", and $\gamma$ is the target gamma, which is generally 2.2. If the gamma value is lower than the target gamma, the display normally has reduced contrast. For example, if the gamma is 1.5, the display has no contrast. However, if the gamma value is higher than the target gamma, e.g. 2.3 or 2.4, the display has too high a contrast. By introducing the target gamma to calculate the brightness at any gray level based upon the power law shown in Eq. (5), the gamma calibration is included in this calibration process. It will be appreciated by those skilled in the art that the brightness $Y_i$ may be calculated in other functions than the power law.

Next, calibration can be carried out at predefined gray levels ($GL_i$) by adjusting pixel values to meet the target chromaticity coordinates $(x_0, y_0)$ and the target brightness $Y_i$ at operation 408. The adjustments of the R, G, B pixel values may be through some iterations until the target brightness and target chromaticity coordinates are within the calibration range. Some adjusted R, G, B pixel values may be different from the pixel level index. For example, for pixel level entry or index 128, a red pixel (R) may have an adjusted value of 127, a green pixel (G) may have an adjusted value of 129, a blue pixel (B) may have an adjusted value of 128. These adjusted pixel values of R, G, and B are listed in a LUT as output of the calibration.

The operations 404, 406 and 408 may be implemented iteratively for each predefined gray step until step index "i" is equal to the maximum step index "imax" at operation 410. Furthermore, other gray levels that are not calibrated may be optionally computed by doing interpolation mathematically using polynomial, bilinear, cubic spline methods and the like based upon the calibrated gray levels at operation 412. The calibration at selected pixel levels combined with the interpolation results in a lookup table (LUT) including 3×M at operation 414, where M is the total number of gray levels. The LUT is an output of the calibration 400 and is stored into a system memory.

Figure 5A:
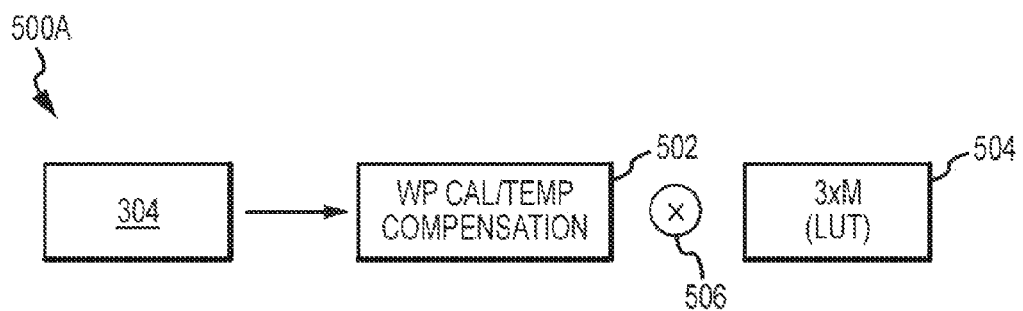
FIG. 5A illustrates a first embodiment of display color calibration architecture.
Figure 5B:
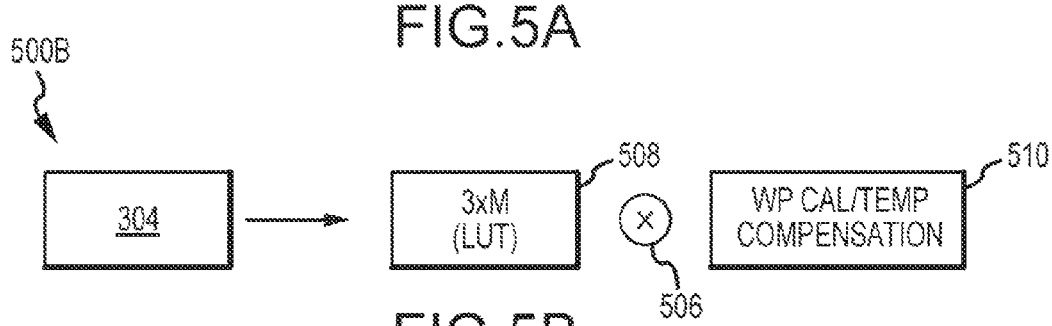
FIG. 5B illustrates a second embodiment of display color calibration architecture.
Figure 5C:
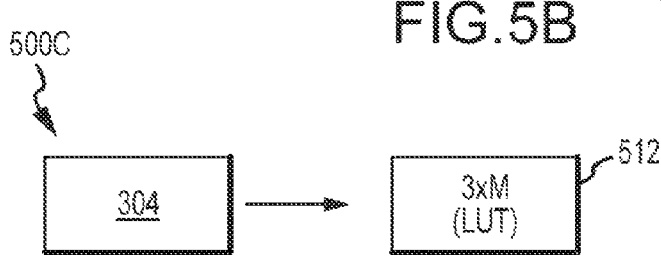
FIG. 5C illustrates a third embodiment of display color calibration architecture.

Values stored in the LUT may be combined with pixel image data, which is also referred to as a pixel pipeline, to perform color calibrations in real time. Specifically, the LUT is generated once for the display, and stored in a memory of the display system. The pixel image data may be come from a video. The real pixel values from the pixel image data are converted to the adapted pixel values in the LUT, based upon the pixel levels and thus the color and contrast of the pixel image data are calibrated based upon the LUT. Therefore, all displays may have the same color and contrast after using the LUT obtained from the calibration 400. It will be appreciated that the calibration 400 that obtains the LUT may have various embodiments. For example, following FIGS. 5A-C illustrate several embodiments for the calibration 400.

Table 1 illustrates an example of a LUT according to embodiments of the present disclosure. For each entry of a gray level index M, adjusted gray levels $R_M$, $G_M$, and $B_M$ are provided for each of the red, green and blue channels in order to have the same target chromaticity and target gamma across the entire defined gray regions. The white point calibration may be considered as part of the gray tracking calibration at a maximum gray level (e.g. 255) such that the adjusted pixel values in the LUT provide the target white point, substantially uniform color for all gray levels, and the target gamma, which are the goals of the white point calibration, gray tracking calibration, and gamma calibration, respectively.

TABLE 1

Example Look-up Table (LUT)

| Pixel Level | Red | Green | Blue |
|---|---|---|---|
| 0 | $R_0$ | $G_0$ | $B_0$ |
| 1 | $R_1$ | $G_1$ | $B_1$ |
| 2 | $R_2$ | $G_2$ | $B_2$ |
| . | | | |
| . | | | |
| . | | | |
| M | $R_M$ | $G_M$ | $B_M$ |

Depending on the display pixel pipeline, the implementation of the color calibration may be applied with an existing white point calibration that provides gain values for red, green, and blue channels. The implementation of the color calibration may also be performed as a standalone procedure. FIGS. 5A-C illustrate three different embodiments of display color calibration architecture. In a first embodiment 500A as shown in FIG. 5A, the display 304 is first calibrated with the white point calibration which produces gain values (input 306 to display 304) for red, green and blue channels and/or with thermal compensation at block 502. Then, at operation 504, the display is calibrated for gray tracking calibration and gamma calibration (input 302 to display 304) to produce a LUT. Operation 506, the LUT obtained from operation 504 multiplies the gain values obtained from block 502 to obtain a LUT as shown in Table 2 below.

In a second embodiment 500B as shown in FIG. 5B, the display 304 is first calibrated for gray tracking and gamma to be substantially independent of gray levels or to achieve uniformity among various gray levels. The gray tracking and gamma calibration at operation 508 generates a LUT, which does not include the adjustment from the white point calibration. A white calibration is done separately at block 502. Then, at block 506, the LUT from operation 508 multiplies with the gain values from a separate white point calibration and/or thermal calibration in block 502 to shift the gray chromaticity to the target for all gray levels. It should be mentioned here that the second embodiment reverses the sequence of the first embodiment and achieve the same results. The output LUT is also as shown in Table 2, where R, G, and B are the gains for red, green and blue channels, and $R_M'$, $G_M'$ and $B_M'$ are the adapted pixel values that include the gray tracking and gamma calibration, but do not include the white point calibration.

The first and second embodiments may be applied for the applications when the white point calibration is done separately from the gray tracking calibration and gamma calibration.

TABLE 2

Example Lookup Table (LUT)

| Pixel Level | Red | Green | Blue |
|---|---|---|---|
| 0 | $R*R_0$ | $G*G_0$ | $B*B_0$ |
| 1 | $R*R_1$ | $G*G_1$ | $B*B_1$ |
| 2 | $R*R_2$ | $G*G_2$ | $B*B_2$ |
| . | | | |
| . | | | |
| M | $R*R_M$ | $G*G_M$ | $B*B_M$ |

In a third embodiment 5000 as shown in FIG. 5O, a single LUT from operation 512 is shown in Table 1, which combines results from the gray tracking calibration, white point calibration, and gamma calibration, by calibration 400. Table 1 is different from Table 2, because the adapted pixel values in Table 1 includes the gain from white point calibration. The first embodiment and the second embodiment have a separate white point calibration from the gray tracking calibration and the gamma calibration, while the third embodiment combines the white point calibration with the gray tracking calibration and gamma calibration to generate adapted pixel values.

By using the calibration methodology 400, gray tracking curves are obtained for both CIE chromaticity coordinates (x, y) both before the calibration and after the color calibration. Selected gray levels are calibrated, such as gray levels 48, 88, 128, 168, 208, 248, while gray levels below 48 may not be calibrated due to insensitivity of chromaticity for dark color for human vision. All other gray levels between the calibrated gray levels may be interpolated such that the overall gray tracking curve remains smooth. The chromaticity uniformity for all gray levels typically is significantly improved after calibration. Specifically, before the color calibration, the chromaticity coordinates vary with gray levels ranging from 48 to 255. For example, the chromaticity coordinates have relatively higher values in the middle gray levels than outside the middle gray region. After the color calibration, the chromaticity coordinate (x, y) remain substantially constant among various gray levels ranging from 48 to 255.

The gamma is characterized before and after the color calibration using 2.2 as a target gamma. The gamma after calibration deviates from the original gamma, particularly in the middle gray levels. The gamma curve after the calibration is essentially the same as the target gamma curve which has a gamma of 2.2. It will be appreciated by those skilled in the art that the target gamma may be other values than 2.2.

Applying Correction Factors in Gray Level Adaptive Calibration

As discussed earlier, the red, green, and blue channels are adjusted iteratively to meet the target chromaticity and the target brightness at operation 408. The reason for iterations to achieve the target chromaticity and target brightness may be due to color shift and sub-pixel crosstalk. The disclosure provides a model that considers the impact of color shift and sub-pixel crosstalk on brightness. Based upon the model, correction factors may be obtained, which help reduce the number of iterations during the calibration 400.

Figures 6E, 6F, 6G, 6H:
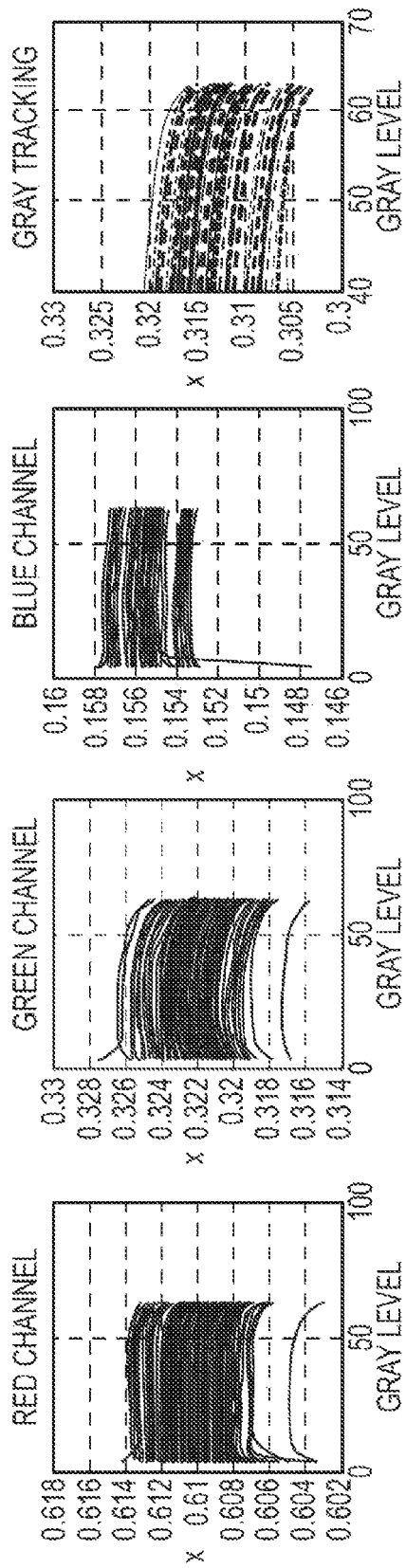
FIG. 6E shows a gray level dependent primary color shift in chromaticity coordinate y for a red channel, according to embodiments of the present disclosure.
FIG. 6F shows a gray level dependent primary color shift in chromaticity coordinate y for a green channel, according to embodiments of the present disclosure.
FIG. 6G shows a gray level dependent primary color shift in chromaticity coordinate y for a blue channel, according to embodiments of the present disclosure.
FIG. 6H shows a gray level dependent primary color shift in chromaticity coordinate y for all color channels, according to embodiments of the present disclosure.

A nonlinearity of the pixel driving voltage may result in the primary color spectrum peak shift. FIGS. 6A-6H show gray level dependent primary color shift in chromaticity coordinates x and y according to embodiments of the present disclosure. FIGS. 6A, 68, and 6C show chromaticity coordinate x versus gray level for red, green and blue colors, respectively. FIG. 6D shows chromaticity coordinate x versus gray levels for all RGB colors. FIGS. 6E, 6F, and 6G show chromaticity coordinate y versus gray level for red, green and blue colors, respectively. FIG. 6H shows chromaticity coordinate y versus gray levels for all RGB colors. These figures show that the chromaticity coordinates x and y vary with colors and gray levels.

Figure 7:
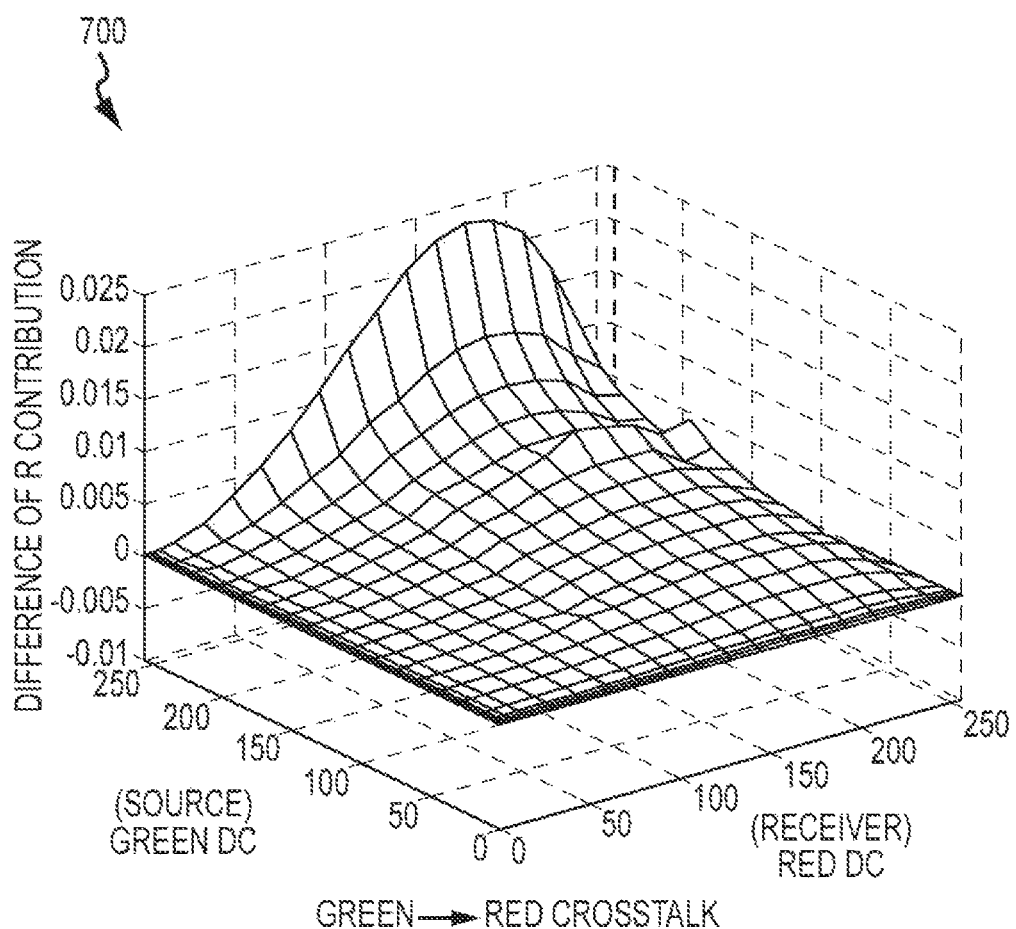
FIG. 7 shows an example of crosstalk between red and green sub-pixels across different gray levels, according to embodiments of the present disclosure.

There is also gray level dependent sub-pixel crosstalk. FIG. 7 shows an example of crosstalk between the red and green sub-pixel across different gray levels according to embodiments of the present disclosure. When a red channel is "off", while a green channel is "on", the red channel may still have a brightness produced by the green channel due to the crosstalk between the red and green sub-pixels. As shown in FIG. 7, the green channel is the source on horizontal axis, and the red channel is the receiver on another horizontal axis, perpendicular to that of the source green channel. The difference in red brightness added by the green channel is shown in a vertical axis. Note that the difference in red brightness varies with gray levels, and is more noticeable in the middle gray levels. The difference may be positive or negative.

Scaling factors R, G, B may linearly relate to color space X, Y, Z by a 3 by 3 matrix with nine coefficients $X_r$, $X_g$, $X_b$, $Y_r$, $Y_g$, $Y_b$, $Z_r$, $Z_g$, and $Z_b$. The primary color shift and the sub-pixel crosstalk may break the linearity between scaling factors or gains R, G, B and color space X, Y, Z in Eq. (1).

$$\begin{bmatrix} X \\ Y \\ Z \end{bmatrix} = \begin{bmatrix} X_r & X_g & X_b \\ Y_r & Y_g & Y_b \\ Z_r & Z_g & Z_b \end{bmatrix} \begin{bmatrix} R \\ G \\ B \end{bmatrix} \quad \text{Eq. (1)}$$

The 3 by 3 matrix correlates the scaling factors or gains R, G, and B to the output color space in X, Y, and Z, which are dependent upon x, y, and $Y_i$, based upon Equations (2)-(4).

$$X = x/y * Y_i \quad \text{Eq. (2)}$$

$$Y = Y_i \quad \text{Eq. (3)}$$

$$Z = (1-x-y)/y * Y_i \quad \text{Eq. (4)}$$

The present disclosure provides a gray level adaptive white point calibration model to compensate for the sub-pixel crosstalk and primary color shift to achieve better calibration accuracy and fast calibration. To compensate for the sub-pixel cross talk and primary color shift, one tedious way is to measure chromaticity and brightness at all gray levels for all red, green, and blue colors and their combinations to produce a LUT. However, such a method requires large amount of measurements, for example, 2563 for an 8 bits display. This is not practical for the factory mass production.

The present disclosure provides a relatively simple display calibration method, which uses a model as shown in Eq. 6 by introducing three gray level dependent correction factors $\alpha_{1(i)}$, $\alpha_{2(i)}$, $\alpha_{3(i)}$, which stand for correction factors for red, green, and blue channels at any gray level $GL_i$ represent by a step index "i". These correction factors are not only gray level dependent, but also are unit based. Therefore, the correction factors are suitable for any unit based color calibration.

$$\begin{bmatrix} X \\ Y \\ Z \end{bmatrix} = \begin{bmatrix} X_r & X_g & X_b \\ Y_r & Y_g & Y_b \\ Z_r & Z_g & Z_b \end{bmatrix} \begin{bmatrix} \alpha_{1(i)}R \\ \alpha_{2(i)}G \\ \alpha_{3(i)}B \end{bmatrix} \quad \text{Eq. (6)}$$

Eq. (6) is modified from Eq. (1) which provides the white point calibration. Eq. (1) is based on the assumption that there is no gray level dependent primary color shift, and sub-pixel crosstalk, so that the static 3×3 matrix can be generated by the measurement of X, Y, Z using full red, green and blue. [R, G, B]$^T$ behaves like a scaling factor and predicts any color at other gray levels than full maximum gray level, and represents a linear relationship from gray level 0 to full gray level, such as 255.

Theoretical R, G, B pixel values are obtained from Eq. (1), as shown in Eq. (7). The static 3×3 matrix may be generated by the measurements of X, Y, Z using full red, green and blue gray levels. Theoretically, scaling factors R, G, and B or R, G, B gain values should be 1 for full white, and each of the scaling factors R, G and B at other gray levels is equal to $(i/255)^{gamma}$. As discussed earlier, the primary color shift and sub-pixel crosstalk may contribute to additional brightness, either positive or negative, to neighbor sub-pixels, such that scaling factors R, G, and G may not equal to 1 at a maximum level and may not equal to $(i/255)^{gamma}$ at other levels lower than the maximum level.

$$\begin{bmatrix} R \\ G \\ B \end{bmatrix} = \begin{bmatrix} X_r & X_g & X_b \\ Y_r & Y_g & Y_b \\ Z_r & Z_g & Z_b \end{bmatrix}^{-1} \begin{bmatrix} X \\ Y \\ Z \end{bmatrix} \quad \text{Eq. (7)}$$

The adjusted or true R, G, B scaling factors represented by R', G', B' are the theoretical R, G, B multiplied by the correction factors, such that the correction factors $\alpha_{1(i)}$, $\alpha_{2(i)}$, $\alpha_{3(i)}$ are expressed by Equation (8):

$$\begin{bmatrix} \alpha_{1(i)} \\ \alpha_{2(i)} \\ \alpha_{3(i)} \end{bmatrix} = \left( \begin{bmatrix} X_r & X_g & X_b \\ Y_r & Y_g & Y_b \\ Z_r & Z_g & Z_b \end{bmatrix}^{-1} \begin{bmatrix} X_i \\ Y_i \\ Z_i \end{bmatrix} \right) \div \left( \frac{i}{255} \right)^{\gamma} \quad \text{Eq. (8)}$$

The correction factors may be obtained at any gray level by measuring the white point at that gray level with all R, G, B channels in an "ON" state. As described earlier, the 3 by 3 matrix is obtained by measurements.

Figure 8:
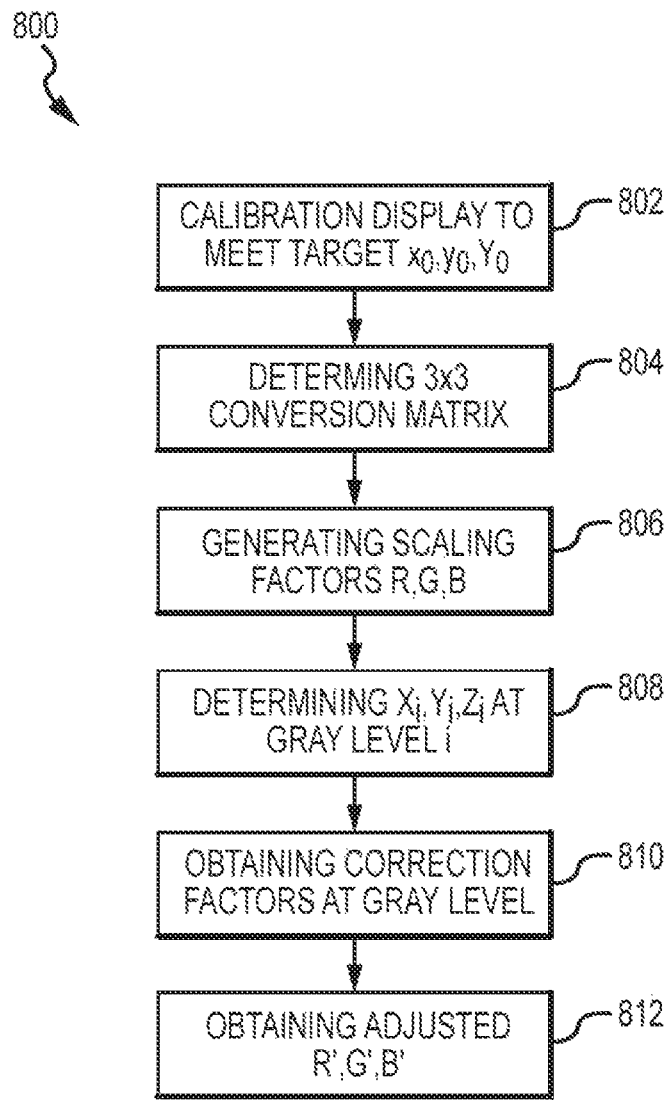
FIG. 8 is a flow chart illustrating operations that may be implemented to apply correction factors to obtain adjusted gain values R', G', B' for a display, according to embodiments of the present disclosure.

FIG. 8 shows a flow chart illustrating steps to apply the correction factors to obtain adjust gain values R', G', B' according to embodiments of the present disclosure. Process 800 includes operation 802 for calibrating a display to meet target white point in chromaticity coordinates ($x_0$, $y_0$) and target brightness $Y_0$. At operation 802, a white point calibration target in chromaticity coordinates ($x_0$, $y_0$) and a target brightness $Y_0$ are provided. The X, Y, and Z are calculated by Eqs. (2)-(4) based upon the target chromaticity coordinates and the target brightness.

Next, at operation 804, the nine coefficients in the 3 by 3 matrix in Eq. (1) may be obtained by measurements for the display system 300. Specifically, when the red channel is "on" while the green channel and blue channel are "off", the gray level is changed from zero to a maximum level, such as 255, the color output or chromaticity coordinates x and y and the brightness are obtained at each gray level for the red channel. Likewise, when the green channel is "on" while the red channel and blue channel are "off", similar measurements are performed. Similarly, when the blue channel is "on" while the red channel and green channel are "off", measurements are performed again. These measurements allow to construct 3 by 3 matrix for conversion of scaling factors or gains R, G, and B to color space X, Y, and Z, as shown in Equation (1), where scaling factors R, G, B represent the input to the display and color space X, Y, Z represent the output of the display. The 3 by 3 matrix includes coefficients $X_r, Y_r, Z_r$ in a first column of the 3 by 3 matrix which can be obtained by turning "on" red channel to full power while truing "off" green and blue channels to measure x, y, and $Y_{max}$, and then calculated based upon Eqs. (2)-(4) below. Similar to the red channel, coefficients $X_g, Y_g$, and $Z_g$ in a second column of the 3 by 3 matrix can be calculated based upon measured x, y, and $Y_{max}$ for the green channel. Likewise, coefficients $X_b, Y_b$, and $Z_b$ in a third column of the 3 by 3 matrix can be calculated based upon measured x, y, and $Y_{max}$ for the blue channel.

At operation 806, theoretical gain values R, G, B are computed by using the inverse of the 3×3 matrix as described in Eq. (7).

At operation 808, chromaticity coordinates and brightness of the display are measured at any gray level $GL_i$. Specifically, for each gray level, each of red, green and blue channels is turned "on" separately, and the chromaticity coordinates $x_i$, $y_i$, and the brightness $Y_i$ are measured by tester 308 at the gray level "i" such that color space $X_i, Y_i, Z_i$ are calculated based upon Eqs. (2)-(4) from the measured chromaticity coordinates $x_i, y_i$, and brightness $Y_i$.

At operation 810, the correction factors are estimated based upon Eq. (8) and the color space $X_i, Y_i, Z_i$ obtained from operation 808. Once the theoretical gain values R, G, B and corrector factors are obtained as described above, the adjusted gain values R', G', B' may be calculated by multiplying the theoretical gain values R, G, B with the respective correction factors at operation 812.

These correction factors may be used as a standalone approach for evaluating the display crosstalk and primary color shift performance. These correction factors may also be combined with the calibration 400 to generate a LUT as shown in Table 3 to include the correction factors obtained from work flow 800. Specifically, the adapted pixel values each of $R_M$, $G_M$, and $B_M$ in Table 1 multiplies respective correction factors $\alpha_{1(i)}, \alpha_{2(i)}, \alpha_{3(i)}$ at respective gray levels to generate Table 3 as shown below. Pixel level M may be to a maximum level of 255, or other specified maximum levels. With the correction factors, the number of iterations in the color calibration 408 may be reduced.

TABLE 3

Example Look-up Table (LUT)

| Pixel Level | Red | Green | Blue |
|---|---|---|---|
| 0 | $\alpha_{1(0)}*R_0$ | $\alpha_{2(0)}*G_0$ | $\alpha_{3(0)}*B_0$ |
| 1 | $\alpha_{1(1)}*R_1$ | $\alpha_{2(1)}*G_1$ | $\alpha_{3(1)}*B_1$ |
| 2 | $\alpha_{1(2)}*R_2$ | $\alpha_{2(2)}*G_2$ | $\alpha_{3(2)}*B_2$ |
| . | | | |
| . | | | |
| . | | | |
| M | $\alpha_{1(M)}*R_M$ | $\alpha_{2(M)}*G_M$ | $\alpha_{3(M)}*B_M$ |

These correction factors may also be applied to the white point calibration method as disclosed in patent application P13378US1, application Ser. No. 13/477,680 without extra measurements, which results in improved iteration accuracy in each level, such that the total iteration number may be further reduced. The reduction in the total iteration number is especially useful for factory implementation in volume production, because any minor calibration accuracy and reduction in calibration time may have a large impact on product yield.

Twenty display panels or units are calibrated by using the calibration at selected gray levels with and without applying correction factors. In a luminance versus gray level curve, relatively large deviations are present between gamma before and after calibration in the middle region of gray levels. The white point calibrations at selected gray levels 64, 128, 192, and 255 are performed with and without applying correction factors. Results are compared in CCT (correlated color temperature) plot across different gray levels in two cases (1) after calibration without correction factors, and (2) after calibration with correction factors. The CCT range is the maximum CCT to the minimum CCT across all the panels or units between gray levels 64 and 255. The gray level adaptive white point calibration approach shows about 40% CCT variation reduction compared to case (1) without using correction factors, which is a significant improvement. The improvement is more at lower gray levels, which may be due to that the signal-to-noise ratio is low at the lower gray levels.

It will be appreciated by those skilled in the art that the calibration procedures may be used for mobile and portable devices or the like.

Having described several embodiments, it will be recognized by those skilled in the art that various modifications, alternative constructions, and equivalents may be used without departing from the spirit of the disclosure. Additionally, a number of well-known processes and elements have not been described in order to avoid unnecessarily obscuring the embodiments disclosed herein. Accordingly, the above description should not be taken as limiting the scope of the document.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method of calibrating a display having color channels, each color channel being capable of adjusting settings for pixel values at gray level entries the method comprising:
    selecting a gray level entry for calibration;
    providing a target white point in chromaticity coordinates (x, y) and a target brightness at the selected gray level entry to the display, wherein the target brightness at the selected gray level entry is determined based on a target gamma value; and
    adjusting the setting for the pixel values for the color channels at the selected gray level entry such that the display achieves the target white point and the target brightness at an adjusted pixel value.

2. The method of claim 1, further comprising obtaining a white point for the display and a gamma for each color based upon a curve of intensities versus gray levels for each color channel; and selecting the gray level entry for calibration based upon the shape of the curve of the intensities versus gray levels.

3. The method of claim 1, further comprising outputting the adjusted pixel value to a memory storage; and storing the adjusted pixel value in a table corresponding to the selected gray level.

4. The method of claim 1, wherein the target brightness at the selected gray level entry is dependent upon the selected gray level entry by a power of the target gamma value.

5. The method of claim 4, wherein the target gamma value is 2.2.

6. The method of claim 1, wherein the target white point is determined according to D65 illuminant of International Commission on Illumination.

7. The method of claim 1, wherein the gray levels ranges 0 to 255.

8. The method of claim 1, wherein each of the selected gray levels increases to next gray level by a constant spacing.

9. The method of claim 1, wherein each of the selected gray levels increases to next gray level by a constant spacing.

10. The method of claim 1, wherein the first selected level is at least 48.

11. The method of claim 1, wherein the color channels comprise red, green, and blue channels.

12. The method defined in claim 1 wherein the target brightness at the selected gray level entry is determined based on the selected gray level entry.

13. A method of calibrating a display by correction factors, the display having color channels, the method comprising:
  calibrating the display to meet a target white point in chromaticity coordinates (x, y) and a target brightness;
  determining a 3 by 3 conversion matrix from the scaling factors R, G, B to color space X, Y, Z;
  generating scaling factors R, G, B for each of the color channels;
  determining color space Xi, Yi, Zi at a gray level i; and
  obtaining corrector factors at the gray level i based upon the inverse of the 3 by 3 conversion matrix and the color space at the gray level.

14. The method of claim 13, wherein the 3 by 3 matrix is shown in the following equation:

$$\begin{bmatrix} X \\ Y \\ Z \end{bmatrix} = \begin{bmatrix} X_r & X_g & X_b \\ Y_r & Y_g & Y_b \\ Z_r & Z_g & Z_b \end{bmatrix} \begin{bmatrix} R \\ G \\ B \end{bmatrix}.$$

15. The method of claim 14, wherein the scaling factors R, G, B are obtained by the following equation:

$$\begin{bmatrix} R \\ G \\ B \end{bmatrix} = \begin{bmatrix} X_r & X_g & X_b \\ Y_r & Y_g & Y_b \\ Z_r & Z_g & Z_b \end{bmatrix}^{-1} \begin{bmatrix} X \\ Y \\ Z \end{bmatrix},$$

wherein X, Y, Z are obtained from the target white point and target brightness.

16. The method of claim 15, wherein the X, Y, and Z are calculated based upon the following equations:

$X = x/y * Y_i$, $Y = Y_i$, and $Z = (1-x-y)/y * Y_i$.

17. The method of claim 14, wherein the correction factors are obtained by the following equation:

$$\begin{bmatrix} \alpha_{1(i)} \\ \alpha_{2(i)} \\ \alpha_{3(i)} \end{bmatrix} = \left( \begin{bmatrix} X_r & X_g & X_b \\ Y_r & Y_g & Y_b \\ Z_r & Z_g & Z_b \end{bmatrix}^{-1} \begin{bmatrix} X_i \\ Y_i \\ Z_i \end{bmatrix} \right) \div \left( \frac{i}{255} \right)^{\gamma}.$$

18. The method of claim 17, wherein the power Y is 2.2.

19. The method of claim 17, wherein i ranges from 0 to 255.

20. The method of claim 13, wherein the color channels comprise red, green, and blue channels.

* * * * *